Dec. 11, 1962 H. W. COOVER, JR., ETAL 3,067,686
TYPE OF PROPELLANT GRAIN
Filed May 5, 1960
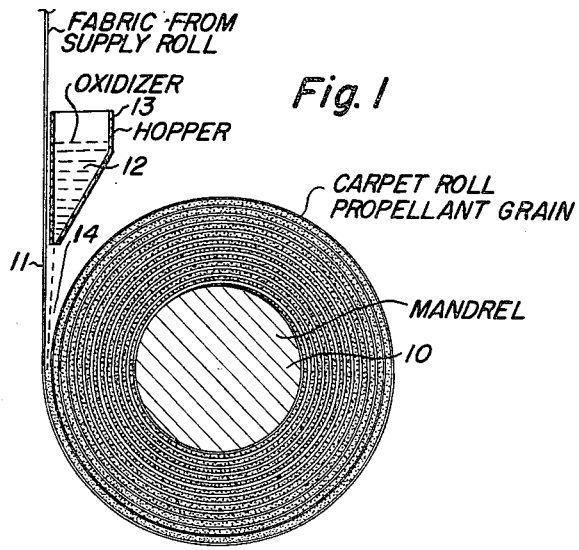
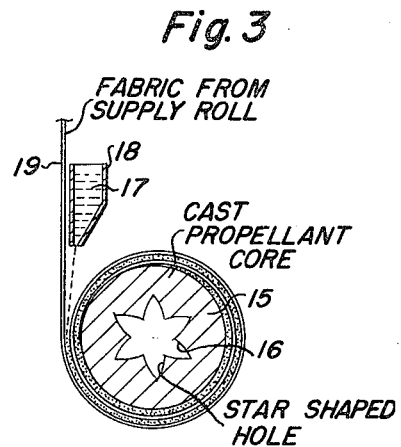
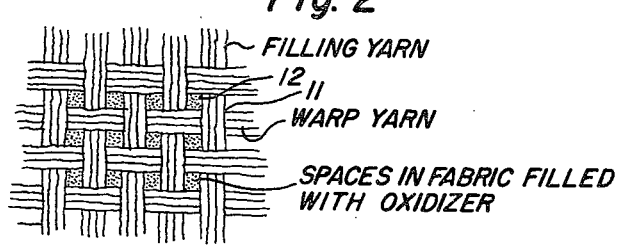
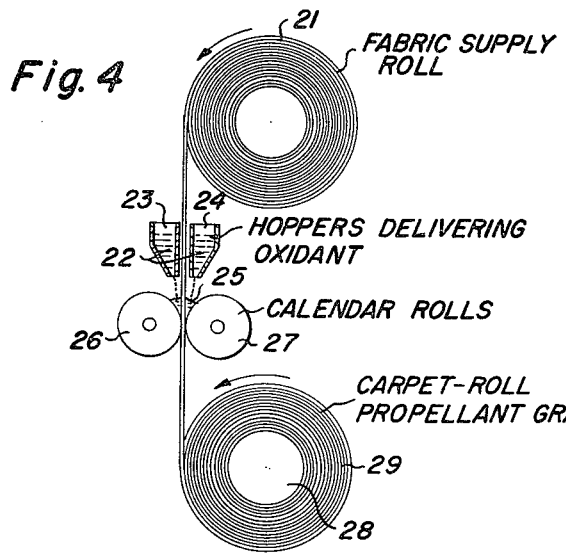
HARRY W. COOVER JR.
WILLIAM D. KENNEDY
INVENTORS
ATTORNEYS 3,067,686
TYPE OF PROPELLANT GRAIN
Harry W. Coover, Jr. and William D. Kennedy, Kingsport, Tenn., assignors to Eastman Kodak Company, Rochester, N.Y., a corporation of New Jersey
Filed May 5, 1960, Ser. No. 27,038
7 Claims. (Cl. 102—98)

This invention is concerned with a new type of propellant. More specifically, this invention is concerned with a new concept of propellant construction and for processes and method for preparing same. Propellants are used in the manufacture of artillery projectiles, aircraft, rockets and the like. In the preferred embodiment of this invention, this new type of propellant is used in the manufacture of rockets, although the inventive concept involved is not to be limited to use in this field.

The importance of improved rockets is obvious and requires little if any further comment. In essence, a rocket comprises two main parts: the "payload" which may be of many shapes, sizes and designs, and the fuel or motor or propellant that generates the energy necessary for transporting the payload to its destination. This invention is concerned with the propellant or motor part of a rocket; the bigger the motor, the bigger the payload and the further a given payload can be delivered. Although our invention is not limited to the preparation of any particular size of rocket, one important result of the inventive concept involved herein is that larger rocket motors than have heretofore been possible to manufacture can now be made.

The preferred solid fuel or motor for a rocket comprises a single grain. The reasons for this choice, which are well-known to those versed in the art, include such factors as efficiency and evenness of burning, safety in firing, and so on. The requirements for this single grain are quite stringent in small rockets and become even more so as the size of the rocket increases. For purposes of clarity, certain of the requirements for a single grain of propellant will be discussed. First, the propellant must be stable, but at the same time, must be capable on combustion of releasing enormously large quantities of energy at controlled rates. This requirement is obvious; however, it requires that essentially every portion of the propellant enter into the energy-producing reaction involved and that it give high-velocity gaseous products of low (18–28) average molecular weights that are themselves thermally stable and innocuous solid products. As will be discussed below, the solid propellant or grain must have certain minimum physical properties. This means that the grain must comprise some strength-giving chemical species that enters efficiently into the energy-producing reaction. Most propellants are made up of an oxidizing agent and a reducing agent that, on ignition, lead to a gas-releasing controlled combustion. Although it is possible to use either the oxidizing agent or the reducing agent as the strength-giving species, it is more common to use the reducing agent in the form of some organic polymer as the strength-giving species. We have found that organic polymers that are in a reduced state, such as aliphatic hydrocarbons, are chemically useful in this regard. Second, the propellant grain must have adequate mechanical strength both during storage and after firing. It must have a tensile strength when fabricated of at least 50 p.s.i., so that it can support its own weight and so that it will retain its shape and will not alter the shape of any shaped channels or perforations that are present or introduced therein. It must have an elongation of at least 30% over a broad temperature range, preferably from —65° to 175° C. and necessarily from normally cool to warm temperatures. This property is of especial importance when the rocket is exposed, as it usually is, to severe temperature cycling where it is important that the grain retain all its physical properties. It must have sufficient elastic modulus to effectively resist deformation during the rapid accelerations to which a rocket is subject. Other mechanical requirements will become apparent in the discussion below.

Third, the grain must have a high density. This is important to the density of the gaseous products produced during combustion, which determines the thrust of the rocket, and also because of dimensional limitations on the size of the rocket. Air resistance being what it is, large diameter rockets must overcome much greater air friction, etc. A dense grain gives a smaller and, therefore, more efficient rocket per pound of propellant.

Fourth, it is preferable that the grain be "case-bondable." In other words, it must be possible to attach the grain securely to the interior of the rocket shell in such a manner that all free space is eliminated.

Fifth, it is important that the burning rate of the grain be controllable. For example, under current conditions, it is desirable that a given grain burn at the rate at least of 3 to 4 inches/second. Other conditions may dictate different controllable burning rates.

Sixth, it is very important that the grain not develop cracks or other structural imperfections during storage and that it not contain undesirable or unanticipated voids, such as entrapped gas bubbles. Control of the rocket depends upon the controlled development of pressure; the pressure is directly proportional to the instantaneous burning surface. If during combustion, cracks or voids are present, additional combustion surface is exposed, greater pressures develop and an explosion will result.

For many uses, it is highly desirable to prepare propellant grains of large diameter. When this is attempted, using techniques currently known and available to the art, very serious problems are encountered. Although many specific difficulties have cropped up, most of them have a common denominator that is related to the temperature needed or developed using current techniques. Most solid propellant combinations now known become unstable somewhere between 80° and 110° C. In other words, if these temperatures are exceeded anywhere in the body of the grain, it "cooks off" or blows up. This criticality of temperature puts a severe chemical limitation on fuels that can be used as propellants; for example, it has already been mentioned that the grain must completely fill the interior of the rocket chamber or case. One method for doing this is to melt the mixture and pour it into the casing. However, as anyone versed in the art of strength of materials knows, materials that melt below 100° C. do not have the strength properties required. Cross-linking these materials to increase their strength has been suggested, and at the current stage of the art that is actually practiced, since no other practical method is available. But this had very serious drawbacks. First of all, all polymerizations are exothermic reactions. Secondly, the material must be cross-linked in its entirety to attain the sought-after strength properties. This means first that polymerization catalysts which may leave undesirable residues in the grain must be used. It also means that when the cross-linking polymerization begins, appreciable quantities of heat are given off. Heat dissipation at the exterior of the grain is no problem; but in the interior of the grain, the heat can only raise the temperature of the grain itself. Rapid polymerization produced by cross-linking may give off so much internal heat that the grain will blow up spontaneously. Accordingly, only those cross-linkers that give off heat very slowly or that have only very low heats of polymerization can be used. This is a very serious limitation, because it requires either exceedingly long, slow "curing" times or it dictates the use of a very limited number of cross-linking agents. And, it goes without saying, that if anything does go wrong, such high concentrations of reactants are present that a tremendous explosion results. These problems are magnified as the diameter of the grain increases and at times have appeared almost insurmountable.

An object, therefore, of our invention is to prepare a propellant grain using a technique that does not suffer any of the serious disadvantages and drawbacks of the previously-described methods. Another object is to prepare a propellant grain that has excellent physical properties. Another object is to provide a simple, safe process for preparing such a grain. A further object is to prepare a propellant grain whose combustion properties can be rigorously controlled and conveniently varied, if desired. Other objects of this invention will appear hereinafter.

The objects of this invention may be attained by preparing propellant grains that, for purposes of clarity, are most conveniently described as having a "carpet-roll construction." More specifically, these objects are attained by adding a powdered or suspended or melted or dissolved oxidizing agent to a flat piece of cloth fabric made from polymerized α-olefin fibers in such a manner that the interstices of the cloth are completely filled with the oxidizing agent and, after pressing these two species between rolls at any desired temperature to achive intimate contact, simply rolling the impregnated cloth up to form the propellant grain. The poly-α-olefin, since it contains only carbon and hydrogen, is an excellent reducing agent. The oxidizing agent, which at any given time, is being "worked" in the presence of only small amounts of fuel (a great safety and therefore financial advantage) can be varied, both as to composition and amount, as is desired.

Our invention will be more readily comprehended by reference to the accompanying drawings in which:

FIG. 1 is a schematic view of a "carpet roll" propellant grain being wound from a fabric of a poly-α-olefin on a mandrel with an oxidizing agent being supplied between the turns of the fabric;

FIG. 2 is an enlarged view of a coarsely-woven fabric of a poly-α-olefin having oxidizer in the form of powder in the interstices of the fabric;

FIG. 3 is a view of a propellant grain being wound on a cast core which has an aperture therein;

FIG. 4 is a schematic drawing showing a method impregnating both sides of a poly-α-olefin web with oxidant to form a propellant grain.

Referring to FIG. 1, there is shown a mandrel 10 suitably rotated by means, not shown, on which there has been wound a length of a web 11 woven from strands of a poly-α-olefin. As the cloth is wound on the mandrel, an oxidizing agent 12 is continuously dropped from hopper 13 into the conveyance 14 of the previously-wound layer and the following layer. Thus, as the mandrel turns, the oxidizer becomes wound between adjacent turns of the poly-α-olefin web and a single grain rocket propellant is formed. After a single grain of a desired diameter is rolled up, the single grain may be removed from the mandrel and installed in a rocket. The fabric is supplied from a supply roll, not shown. The oxidizer in particular fills the spaces between the filling and warp of the fabric as shown more clearly in FIG. 2.

Referring to FIG. 3, there is shown a rocket grain being similarly formed on a propellant core 15 which has been cast from a poly-α-olefin with a star-shaped aperture 16 therein. The oxidizer 17 is supplied between turns of the fabric 19 from hopper 18.

Referring to FIG. 4, a poly-α-olefin fabric 21 is unwound from a roll thereof and passed between two hoppers 23 and 24 which are filled with oxidizer 22 and thence between two nip rolls 26 and 27. The hoppers release the oxidizer to form a bead of oxidizer on each side of the fabric above the nip of the rolls. The pressure of the rolls forces the oxidizer into the interstices of the fabric which is then wound up on mandrel 28 to form a single grain propellant 29, which can be used in rocket propulsion.

The variations that can be applied using the inventive concept involved are many—the oxidizing agent can be added as an emulsion, which is dried on the fabric. It can be suspended in a liquid reducing agent such as mineral oil and absorbed into the fabric. It can be melted or suspended in a solid reducing agent such as polyethylene wax and knife-coated onto the fabric. It can be added to the fabric as a powder. It can be suspended in a thixotropic medium and coated onto the fabric. The fabric itself can comprise woven filaments or, in some cases, non-woven filaments. Since it is highly desirable for the propellant grain to have superior strength properties, it is preferred to use poly-α-olefin filaments that have been oriented. When this is done, grains that have mechanical strength far superior to any obtained before result. The importance of this superior strength cannot be overemphasized. Another important aspect of this invention is its simplicity combined with its versatility and its safety. A propellant grain 6 inches or 6 feet or 60 feet in diameter can be made with equal simplicity, simply by winding more fabric onto the roll. From a safety point of view, only small amounts of critical materials such as the oxidant are present at any one time and the oxidant-reductant combination is never exposed to unsafe or to unknown temperatures. In other words, no exothermic chemical reaction such as cross-linking is required to achieve sufficient grain strength. A further very important advantage is that almost any chemically-desirable species can be used since temperature considerations are no longer so critical. Because of the close control that can be kept on the operation, an extremely uniform product can be obtained. This has pronounced advantages where uniform and reproducible combustion rates, etc. are desired or necessary. The merit of versatility is illustrated in cases where case-bonding the grain to the walls of the rocket is desirable. In the last few wraps on the "carpet roll" the oxidant can be omitted. Instead, a binder such as fiber glass, metal foil, wire, and the like can be included or, if desired, chemical bonding agents can be added to expedite case bonding. Alternately, these outer layers may comprise the case itself. For example, reinforcing materials such as glass fabric, metal wires or foil, etc. could be wound on the roll and adhesives or polymerizable monomers or cross-linkable polymers could be applied to bond and stiffen the layers.

It is important to realize that the inventive concept of this invention is amenable to almost infinite variation in actual practice. For example, it was mentioned above that channels or perforations are usually included in the grain (to control the pressure profile as the propellant burns). The shape of this perforation or channel can be varied in our process simply by winding the fabric on variously-shaped mandrels or, if preferred, an aperture of any diameter can be left in the grain and a core made from plastic or other castable material containing any shape or size of channel can be inserted.

The construction of the supporting fabric itself can be varied, the denier can be varied, the shape of the interstices can be controlled during the weaving operation, etc. A variable denier in the filling, for example, can be used to vary the cross-section of the channel and thus the burning rate of the grain if desired. The rate of burning along the axis or radius of the grain can be controlled by varying the type or concentration of oxidant or other species as it is applied to the cloth prior to wrapping. The cloth itself can be used alone or in combination with other materials such as films, perforated films, foams and the like.

Although one of the advantages of our invention is that temperature variations can be eliminated or minimized, it should be understood that various "curing" techniques can be used therewith if desired. For example, the materials in the grain can be treated chemically or they can be heated or they can be irradiated with ionizing radiation, etc., should that be desirable.

One current method for preparing propellant grains comprises pouring a thixotropic material into the rocket case. On standing, the mixture "sets up" or gels to form a semi-solid mass. The process has, among others, one serious disadvantage not suffered by the products of our invention, namely, these thixotropic materials are extremely sensitive and physically unstable when subjected to temperature changes and the ambient temperature cycling that is inherent in most rocket use seriously limits their usefulness.

In other current methods for preparing propellant grains, particularly those that involve a curing step, extreme care must be taken to eliminate irregularities in the grain. In attempts to avoid or minimize bubble formation, the whole process is carried out in high vacuum. This, of course, is extremely expensive. This disadvantage is completely eliminated in our invention. Or, in other cases, extreme care must be taken to avoid shrinking and attendant crack formation or even the setting up of strains during curing. This difficulty requires expensive time cycles, but is completely eliminated in our invention.

As research on propellants increases, various compounds are being and will be discovered that can be added to the grain to improve its stability, combustion characteristics, physical properties and the like. One of the outstanding features of our invention is the ease with which additives can be included in the grain. For example, powdered metals such as boron, aluminum, etc. can be added to enhance the energy of combustion. They can be placed anywhere within the diameter of the grain or along its axis and their type and concentration can be varied infinitely.

It should also be understood that the inventive concept of our invention is not limited to any particular type or class of oxidizing or reducing agents. As oxidants, the perchlorates are currently advantageous and they work well in our invention. But other oxidants of almost any type are compatible with and can be used in the process of our invention. The reductant can also be varied widely. In its broadest concept, any material of strength can be used as the supporting material (even an oxidizing agent, should a desirable one become available). We prefer, for reasons described earlier, to use an oriented fiber derived from a poly-α-olefin, such as polyethylene or polypropylene, but it should be understood that other materials such as polystyrene fibers, polyurethanes and the like can also be used. The ratio of oxidant to reductant can also be varied indefinitely. Usually, a weight excess of the oxidant is used, but stoichiometrically, it is common to use an excess of the reductant. These ratios are not critical to our invention and may be varied as desired.

Our invention is illustrated by the following examples, but it should be understood that these examples are illustrative only, and should not be construed as limiting the scope of our invention in any way.

*Example 1*

A 12-inch wide roll of polyethylene cloth made from fiber having a tenacity of 5 g./denier and an extensibility of 32% was passed over guides and between two pinch rolls that were kept under slight pressure. A slurry of powdered ammonium perchlorate in mineral oil was added to the full width of the cloth as it passed between the nip of the rolls. The cloth, the interstices of which were completely filled with the oxidant slurry, was wound on a rotating mandrel which was kept in intimate contact with the cloth by means of a roll which, although under constant pressure, was movable. The mandrel was rotated until the grain had a diameter of 2 inches.

*Example 2*

An 18" wide roll of polypropylene cloth made from fiber having a tensile strength of 8 g./den. and an extensibility of 25% was passed over guides and between two pinch rolls that were kept in contact under slight pressure. A slurry of ammonium perchlorate in mineral oil was added in the same manner as is described in Example 1. A grain having a final diameter of 4" was obtained.

*Example 3*

The procedure described in Example 1 was used, except that a dispersion of lithium perchlorate in polyethylene wax was used instead of the ammonium perchlorate-mineral oil slurry.

*Example 4*

The procedure described in Example 1 was used except that a dry oxidant comprising aluminum powder and ammonium perchlorate was used instead of the ammonium perchlorate-mineral oil slurry. The pressure roll was warmed to approximately 100° C. to assist in bonding the dry oxidant to the supporting cloth.

*Example 5*

The procedure described in Example 1 was used except that a 24-inch wide non-woven polyethylene fabric made by heat-bonding lofted (i.e. bulked) polyethylene fibers was used instead of the polyethylene cloth. A grain having a final diameter of 8" was obtained.

*Example 6*

The procedure described in Example 1 was used except that a piece of fabric 54" wide was used and a grain having a final diameter of 14" was obtained.

*Example 7*

The procedure described in Example 1 was used except that the polyethylene cloth, after addition of the oxidant slurry, was jointly wound on a rotating mandrel with a layer of polyethylene film so that the oxidant in the final grain was located between a layer of polyethylene cloth and a layer of polyethylene film.

The single grain propellants made according to our invention provide improved propelling means for various types of rockets and can be made with less risk of explosion than other types of rocket grains.

We claim:

1. A rocket propellant grain comprising rolled-up layers forming a tubular member having high mechanical strength, said rolled-up layers of said tubular member comprising (A) an oxidizing agent and (B) a plurality of turns of fibrous sheet material having interstices therein and consisting of poly-α-olefin fibers, said oxidizing agent being substantially uniformly disposed between the adjacent turns of the sheet material and in the interstices thereof.

2. A rocket propellant grain comprising rolled-up layers forming a tubular member having good mechanical strength, said rolled-up layers of said tubular member comprising (A) an oxidizing agent selected from the group consisting of ammonium perchlorate and lithium perchlorate and (B) a plurality of turns of fibrous sheet material having interstices therein and consisting of poly-α-olefin fibers selected from the group consisting of polyethylene and polypropylene, said oxidizing agent being substantially uniformly disposed between the adjacent turns of the sheet material and in the interstices thereof.

3. A rocket propellant grain comprising rolled-up layers forming a tubular member having good mechanical strength, said rolled-up layers of said tubular member comprising (A) a mixture consisting essentially of aluminum powder and an oxidizing agent selected from the group consisting of ammonium perchlorate and lithium perchlorate and (B) a plurality of turns of woven fibrous material having interstices therein and consisting of oriented poly-α-olefin fibers selected from the group consisting of polyethylene and polypropylene, said mixture (A) being substantially uniformly disposed between the adjacent turns of the sheet material and in the interstices thereof.

4. A rocket propellant grain comprising rolled-up layers forming a tubular member having high mechanical strength, said rolled-up layers of said tubular member comprising (A) ammonium perchlorate and (B) a plurality of turns of woven fibrous sheet material having interstices therein and consisting of oriented polypropylene fibers, said ammonium perchlorate being substantially uniformly disposed between the adjacent turns of woven fibrous sheet material and in the interstices thereof.

5. A rocket propellant grain comprising rolled-up layers forming a tubular member having high mechanical strength, said rolled-up layers of said tubular member comprising (A) ammonium perchlorate and (B) a plurality of turns of woven fibrous sheet material having interstices therein and consisting of oriented polyethylene fibers, said ammonium perchlorate being substantially uniformly disposed between the adjacent turns of woven fibrous sheet material and in the interstices thereof.

6. A rocket propellant grain comprising rolled-up layers forming a tubular member having high mechanical strength, said rolled-up layers of said tubular member comprising (A) lithium perchlorate and (B) a plurality of turns of fibrous sheet material having interstices therein and consisting of oriented polyethylene fibers, said lithium perchlorate being substantially uniformly disposed between the adjacent turns of the sheet material and in the interstices thereof.

7. A rocket propellant grain comprising rolled-up layers forming a tubular member having high mechanical strength, said rolled-up layers of said tubular member comprising (A) a mixture comprising aluminum powder and ammonium perchlorate and (B) a plurality of turns of woven fibrous sheet material having interstices therein and consisting of polypropylene fibers, said mixture (A) being substantially uniformly disposed between adjacent turns of the sheet material and in the interstices thereof.

References Cited in the file of this patent

UNITED STATES PATENTS

| | | |
|---|---|---|
| 2,408,252 | De Ganahl | Sept. 24, 1946 |
| 2,668,132 | Baker | Feb. 2, 1954 |
| 2,918,005 | Schecter et al. | Dec. 22, 1959 |
| 2,926,613 | Fox | Mar. 1, 1960 |
| 2,939,275 | Loedding | June 7, 1960 |
| 3,000,308 | Land et al. | Sept. 19, 1961 |

OTHER REFERENCES

Solid Fuel Industry Round-up, Missiles and Rockets Magazine; vol. 2, No. 8; August 1957; pages 67–73 (page 71 required).